No. 694,018. Patented Feb. 25, 1902.
E. KASTNER.
ELECTRIC HEATING DEVICE.
(Application filed June 17, 1901.)

(No Model.)

WITNESSES
INVENTOR
Emil Kastner.
by Herbert W. T. Jenner,
Attorney

THE NORRIS PETERS CO., PHOTO-LITHO., WASHINGTON, D. C.

UNITED STATES PATENT OFFICE.

EMIL KASTNER, OF BERLIN, GERMANY.

ELECTRIC-HEATING DEVICE.

SPECIFICATION forming part of Letters Patent No. 694,018, dated February 25, 1902.

Application filed June 17, 1901. Serial No. 64,807. (No model.)

*To all whom it may concern:*

Be it known that I, EMIL KASTNER, a citizen of the German Empire, residing at Berlin, Prussia, Germany, have invented certain new and useful Improvements in Electric-Heating Devices; and I do hereby declare the following to be a full, clear, and exact description of the invention, such as will enable others skilled in the art to which it appertains to make and use the same.

The present invention relates to an apparatus for electrically heating liquids—as, for instance, beer, milk, or the like—which is convenient for use in public places as well as in private.

The apparatus is shown in the accompanying drawings, in which—

Figure 1:
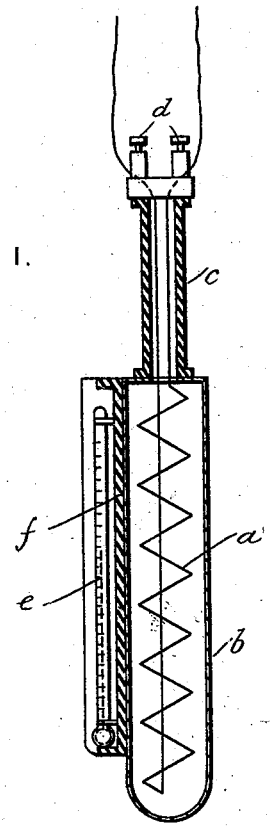
Figure 3:
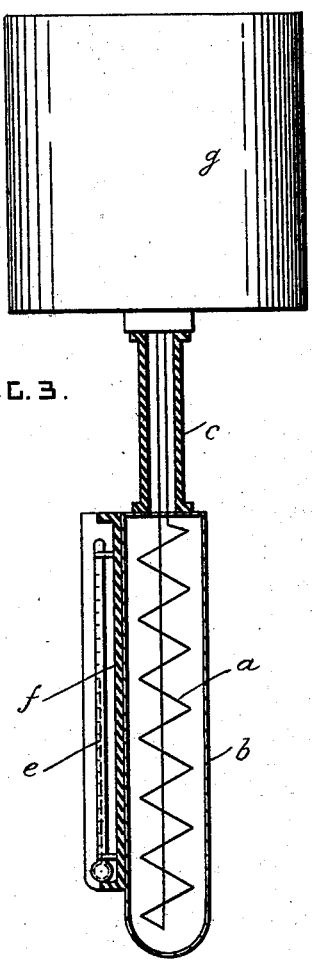
Figure 2:
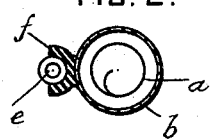

Figure 1 is a longitudinal section of the same. Fig. 2 is a cross-section of the heater; Fig. 3, a longitudinal section of a modified form of apparatus, and Fig. 4 is a plan view of the latter.

The device consists of an electric wire or conductor $a$ of great resistance, which may be inclosed in a casing $b$, which latter can besides be filled with a non-conducting material for heat-transmitting purposes. The upper part $c$ of the casing is preferably constituted by non-conducting material, to which is applied the contact-screws $d$ for connecting the apparatus to an electric source. A thermometer $e$ is attached to the casing and isolated from the latter by a heat-isolating partition or mass $f$.

The apparatus is introduced into the receptacle containing the liquid to be heated and when the circuit is closed a high temperature is produced in the resistance $a$, which is transmitted to the liquid, while the thermometer, also immersed in the liquid, allows of an exact inspection of the working of the apparatus—*i. e.*, of the heat. The neck or the upper part $c$ being insulated, the lowest layers of the liquid are first heated, and thus are caused to circulate strongly and to equalize the temperature throughout the vessel.

Figure 4:
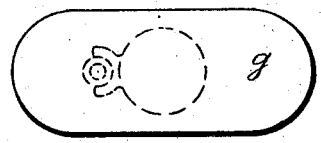

Figs. 3 and 4 show a modified construction of the heater, in which the electrical source—for instance, a dry battery $g$—is connected with the apparatus. Said element remains, of course, outside the liquid-receptacle and the apparatus can be brought into action instantaneously by means of a convenient switch or the like.

If desired, the apparatus can be made transportable, so as to be carried in the pocket, in which case the battery is preferably of flat form, as shown in plan view in Fig. 4.

Having now particularly described and ascertained the nature of my said invention and in what manner the same is to be performed, I declare that what I claim is—

1. In an electric heater, the combination, with a portable casing, and resistance-wires inclosed therein; of a thermometer secured against one side of the casing for indicating the temperature of the fluid into which the said casing and thermometer are plunged, and non-heat-conducting material between the said casing and thermometer whereby the direct passage of heat from the casing to the thermometer is prevented, substantially as set forth.

2. In an electric heater, the combination, with a portable casing, and resistance-wires inclosed therein; of a thermometer-tube secured against one side of the casing with its bulb opposite the lower parts of the said resistance-wires, and non-heat-conducting material arranged between the said thermometer and the casing and partly encircling the thermometer, whereby the direct passage of heat from the casing to the thermometer is prevented, and the thermometer is adapted to indicate the temperature of the fluid into which it and the said casing are plunged, substantially as set forth.

In testimony whereof I affix my signature in presence of two witnesses.

EMIL KASTNER.

Witnesses:
　HEINRICH KARNOP,
　CARL BARTSCH.